(12) United States Patent
Gose et al.

(10) Patent No.: US 10,746,118 B1
(45) Date of Patent: Aug. 18, 2020

(54) COMPENSATOR CIRCUITRY AND METHOD FOR AN OXYGEN SENSOR

(71) Applicant: DELPHI TECHNOLOGIES IP LIMITED, St. Michael (BB)

(72) Inventors: Mark W. Gose, Kokomo, IN (US); Jerry W. Campbell, Carmel, IN (US); Eugene V. Ripley, Russiaville, IN (US); Marc R. Englehardt, Kokomo, IN (US); Jingyi Hou, Westfield, IN (US)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days.

(21) Appl. No.: 16/460,611

(22) Filed: Jul. 2, 2019

(51) Int. Cl.
  *F02D 41/14* (2006.01)
  *F02D 41/20* (2006.01)

(52) U.S. Cl.
  CPC ..... *F02D 41/1494* (2013.01); *F02D 41/1446* (2013.01); *F02D 41/1454* (2013.01); *F02D 41/1495* (2013.01); *F02D 2041/2027* (2013.01)

(58) Field of Classification Search
  CPC ............ F02D 41/1494; F02D 41/1446; F02D 41/1495; F02D 41/1454; F02D 2041/2027
  USPC ................................................. 123/693, 697
  See application file for complete search history.

(56) References Cited

U.S. PATENT DOCUMENTS

| | | | |
|---|---|---|---|
| 5,719,778 A | 2/1998 | Suzumura et al. | |
| 5,720,863 A * | 2/1998 | Kim | G01N 27/407 204/406 |
| 6,192,874 B1 * | 2/2001 | Dekoninck | G01N 27/4067 123/697 |
| 6,781,098 B2 | 8/2004 | Toyoda | |
| 7,467,628 B2 | 12/2008 | Adams et al. | |
| 2004/0149008 A1 * | 8/2004 | Allmendinger | G01N 27/419 73/23.31 |
| 2010/0073017 A1 * | 3/2010 | Bevot | G01N 27/4067 324/703 |
| 2014/0076741 A1 * | 3/2014 | Adams | G01N 27/4163 205/785.5 |
| 2015/0323493 A1 * | 11/2015 | Uemura | F02D 41/28 204/406 |

* cited by examiner

*Primary Examiner* — Mahmoud Gimie
(74) *Attorney, Agent, or Firm* — Joshua M. Haines

(57) ABSTRACT

Compensator circuitry is provided for an oxygen sensor which includes a pump cell and a reference cell. The compensator circuitry includes a feedback control loop which maintains the reference cell at a reference voltage. The feedback control loop includes a digital compensator which determines and outputs a compensation current to the pump cell dependent on a reference voltage measured from the reference cell. The digital compensator also suspends the determination and output of the compensation current for a set time which is dependent on detection of edges in an oxygen sensor heater Pulse Width Modulation signal.

16 Claims, 4 Drawing Sheets

COMPENSATOR CIRCUITRY AND METHOD FOR AN OXYGEN SENSOR

TECHNICAL FIELD

This invention relates to wide range oxygen (O2) sensors, and typically such sensors are used in vehicle systems to determine oxygen levels in e.g. exhausts. Such sensors are often referred to as lambda sensors. It particularly relates to circuitry used to operate such oxygen sensors. The circuitry may e.g. be embodied on a chip connected to a microprocessor and the sensor.

BACKGROUND OF THE INVENTION

Typically, an O2 sensor is mounted in the exhaust system of an engine to monitor how much unburned fuel or excess oxygen is in the exhaust as the exhaust gas exits the engine. Monitoring oxygen levels in the exhaust is a way of gauging the fuel mixture.

An O2 or lambda sensor is based on solid-state electrochemical reactions. The sensor can be constructed of one or two cells. When coupled to an appropriate electrical interface, a current is produced that varies approximately linearly with the partial pressure of oxygen in the exhaust gas relative to that in the atmosphere.

In wide-range air fuel sensors, the temperature of the sensor must be tightly controlled at temperatures of around 750 C. This temperature is achieved by use of a resistive ceramic heating element within the sensor. Typically, cell impedance measurements are performed on an O2 Sensor in order to estimate its temperature. This temperature is subtracted from a desired temperature to provide an error value. This error term can be used as an input to a control loop that varies the PWM duty cycle of battery voltage applied across an e.g. ceramic heating element embedded in the sensor. This control loop seeks to maintain the temperature error at a low value.

So in other words, as mentioned, in wide-range air fuel sensors, the temperature of the sensor must be tightly controlled at temperatures of around 750 C. This temperature is achieved by use of a resistive ceramic heating element within the sensor. This element is capable of heating the sensor from ambient alone or by supplementing the engine exhaust heat. In order to provide power to the resistive ceramic heating element, the automotive 12V battery voltage is applied across the element in a pulse width modulated fashion. The impedance of the sensor reference cell is measured and used to indicate the temperature of the sensor. A control loop is utilized to modify the PWM duty cycle to adjust the amount of heating to maintain the desired temperature.

In the control of O2 sensors, a problem exists where the PWM control of the ceramic heater can disrupt the closed loop control of the reference and pump cells of the sensor. This results in the PWM switching edges causing pump cell current errors for an extended period of time after the edge. This limits the ability to use the sensor where engine synchronous pump current readings are desired. Since the O2 sensor is located in the exhaust stream, there is an electrical cable that connects it to the sensing module. For a typical two cell sensor, this cable contains six wires which include: reference, sensor common, pump, tag, heater+ and heater−. Due to the nature of the heating element, the PWM control of the sensor's heater causes large DV/DT's and large DI/DT's in the heater wires within the cable as well as within the sensor itself. The current in the heater can be on the order of a few amps. This can couple noise onto the other wires in the cable.

It is one object of the invention to overcome these problems.

SUMMARY OF THE INVENTION

In one aspect is provided a compensator circuitry for an oxygen sensor, said oxygen sensor including a pump cell and a reference cell, said compensator circuitry including a feedback control loop configured to maintain the reference cell at a reference voltage, said feedback control loop including a digital compensator, configured to determine and output a compensation current to said pump cell dependent on a reference voltage measured from said reference cell, and further configured to suspend the determination and output of said compensation current for a set time dependent on detection of edges in an oxygen sensor heater Pulse Width Modulation (PWM) signal.

Said digital compensator may be programmable.

Said set time may be programmable.

The compensator circuitry may be configured to suspend the determination and/or output of said compensation current for a set time subsequent to detection of a rising or falling edge of said PWM signal.

The compensator circuitry may include means to detect a rising or falling edge of said PWM signal.

The compensator circuitry including means to provide a suspend signal or time of programmable length subsequent to the detection of a rising or falling edge of said PWM signal.

The compensator circuitry may be further configured to convert the measured reference voltage of the reference cell to a digital quantity, and further configured to digitally compare this with a digital reference value, so as to provide a digital comparison for said digital compensator, where said compensation current is determined from said digital comparison.

The compensator circuitry may further include means to determine the compensation current to be output to the pump cell, and convert this to a digital value.

The circuitry may be configured to suspend the determination and output of said compensation current by being configured to suspend receiving the input derived from said reference cell and/or suspend the determination and/or output of the output current.

In a further aspect is provided an oxygen sensor system including an oxygen sensor, said oxygen sensor including a pump cell and a reference cell, and including a heater means configured to receive a PWM signal to control said heater, and compensator circuitry as above connected to said oxygen sensor.

In a further aspect is provided a method of operating compensator circuitry for an oxygen sensor, said oxygen sensor including a pump cell and a reference cell, said compensator circuitry including a feedback control loop adapted to maintain the reference cell at a reference voltage, said feedback control loop including a digital compensator, configured to determine and output a compensation current to said pump cell dependent on a reference voltage measured from said reference cell, said method including: a) detecting edges in an oxygen sensor heater Pulse Width Modulation (PWM) signal; b) suspending determination and output of said compensation current for a set time dependent on step a).

Said set time may be programmable.

Step a) may comprise suspending the determination and/or output of said compensation current for a set time subsequent to detection of a rising or falling edge of said PWM signal.

The method may include providing a suspend signal or suspend signal time of programmable amount subsequent to the detection of a rising or falling edge of said PWM signal.

The method may include the steps of converting the measured reference voltage of the reference cell to a digital quantity, and digitally comparing this with a digital reference value, providing a digital comparison to said digital compensator, and determining said compensation current from said digital comparison.

Step b) may comprise suspending the receiving of input derived from said reference cell and/or suspending the determination and or output of the output current.

BRIEF DESCRIPTION OF THE DRAWINGS

The present invention is now described by way of example with reference to the accompanying drawings in which.

DESCRIPTION OF THE PREFERRED EMBODIMENTS

Figure 1:
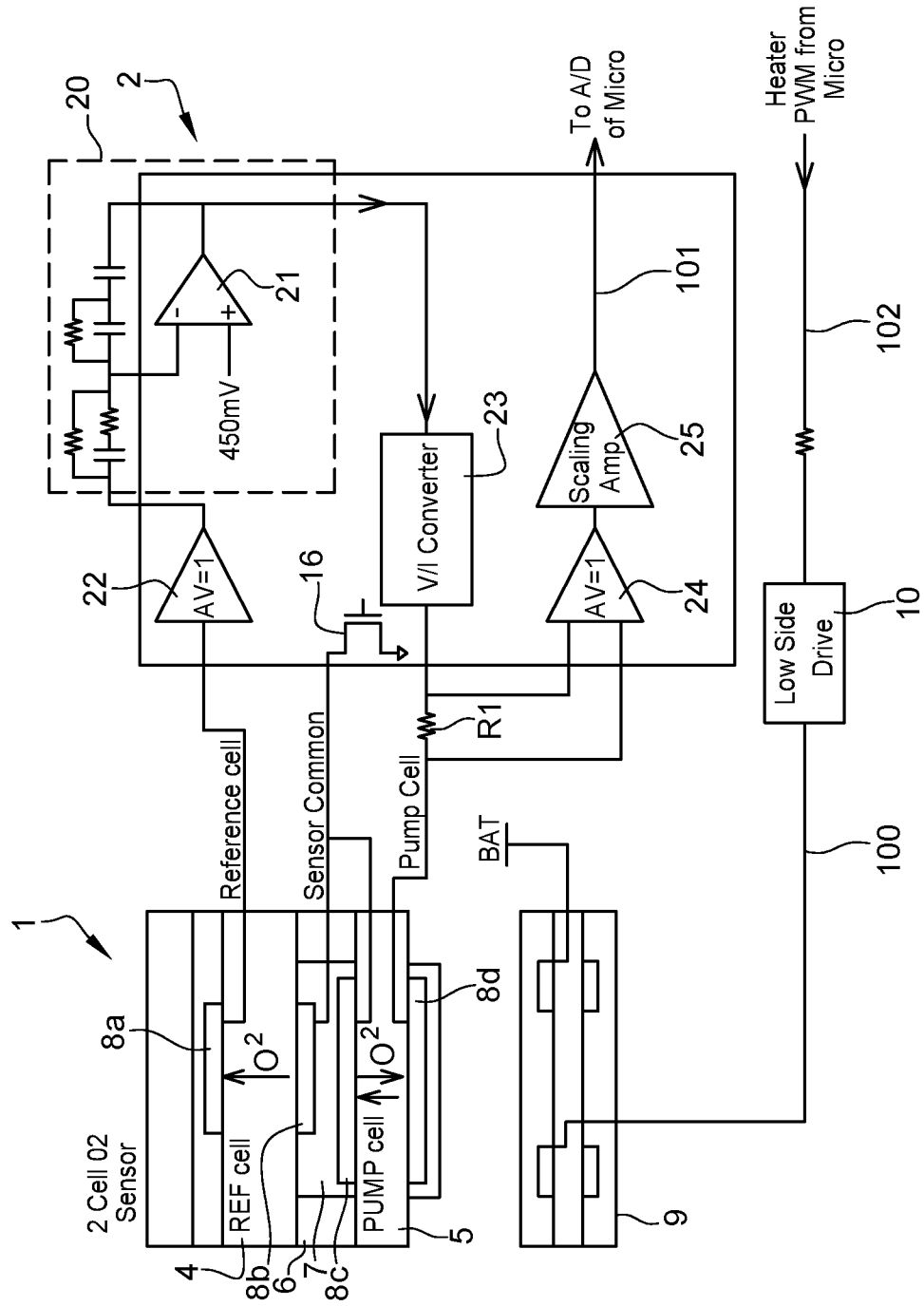
FIG. 1 shows an existing O2 sensor control IC with an analog compensator.

FIG. 1 shows a schematic view of a known O2 sensor system—it shows the 2-cell O2 sensor 1. A sensor interface IC 2 generally interfaces between the sensor and a microprocessor (not shown). Tasks of the microprocessor include converting the pump current readings from the sensor interface IC 2 to air/fuel ratio along with reading the sensor impedance related measurements made by the sensor interface IC 2 and adjusting the heater PWM to control temperature.

It should be noted that any functionality of the sensor interface IC 2 may be performed by the microprocessor and vice versa.

On the left hand side is shown the sensor itself which is a 2-cell sensor known in the art. The sensor (element) includes a measurement or reference (REF) cell 4 and a pump cell 5. The two cells 4, 5 are separated on sides by a porous diffusion component 6 (which provides/defines a porous diffusion passage) so as to form a gas detecting cavity 7. Electrodes 8 a, b, c, d are located on either side of the cells 4, 5 and provide appropriate input and outputs to the other parts (circuitry) of the system.

Adjacent to the O2 sensor is a heater 9 such as a ceramic heater. This is connected by one line to a battery (vehicle battery) and controlled by a microprocessor (not shown) via a Low Side Driver 10 and heater wire(s) 100. Driving the high side instead of the low side is acceptable, as is controlling both sides with the microprocessor.

The electrodes 8 a, b, c, d of the two cells 4, 5 are connected to the sensor interface IC 2/circuitry, the sensor interface IC 2 has input and output connections to the microprocessor not shown which is used to measure and process the inputs from the electrodes (via the sensor interface IC 2) as well as output to control the voltages of the electrodes 8b and 8c via FET 16. The lines from the microprocessor to the FET 16 are not shown.

A two cell O2 sensor is controlled by two control loops, one maintains the proper sensor voltage/current bias while the other maintains the sensor temperature. The proper O2 sensor bias is controlled by adjusting the pump current (i.e. the current through the pump cell 5) in order to maintain the reference cell voltage (e.g. electrode 8a) at e.g., 450 mV.

The figure shows the bias control circuit portion of the intermediate IC/circuitry which implements a transfer function specified by the manufacturer for a specific sensor model to insure proper loop performance.

The temperature control is accomplished by measuring the reference cell impedance to determine temperature along with applying Pulse Width Modulation of the battery voltage across the ceramic heater to apply power.

With regard to FIG. 1 therefore, the primary control of a two cell O2 sensor 1 involves applying the reference cell voltage to a compensator network which is tasked with the primary control. Reference numeral 2 shows the functionality of the sensor interface IC with regard to the compensator network i.e. the bias control circuitry.

The compensator includes a connection from electrode 8a to the unity gain amplifier 22. The output of the unity gain amplifier 22 is connected to one input of an operational amplifier circuit 20. The other input to operational amplifier circuit 20 is connected to a voltage of (e.g., 450 mV). Operational amplifier circuit 20, comprised of discrete resistors, capacitors and operational amplifier 21, implements a desired transfer function to stabilize this control loop.

The output of the operational amplifier circuit 20 is connected to a voltage to current converter 23 which adjusts the current into the pump cell 5 via electrode 8d dependent on the voltage output from operational amplifier circuit 20. The current into the pump cell 5 modifies consequently the reference voltage which the loop maintains at e.g., 450 mV. The value of the pump current that is required to achieve 450 mV of reference voltage is dependent on the O2 concentration in the exhaust gases.

The pump current is measured by measuring the voltage across resistor R1 by unity gain amplifier 24 which is then amplified by appropriate scaling amplifier 25, the output of which is sent to the microprocessor along line 101—the microprocessor converts this signal representing O2 concentration to an air/fuel (A/F) ratio.

As shown in FIG. 1, this compensator, in previous art, is an analog compensator implementing the transfer function with operational amplifiers and external resistors and capacitors.

The secondary control is the sensor temperature control loop described previously.

As mentioned briefly, a problem is that when the transient voltage and currents on the heater wires 100 couple into the reference cell, this is disruptive to the primary control loop since it shows up as a deviation from the desired reference cell voltage of 450 mV. Due to the nature of the control loop, this disruption causes a variation in the pump current as the loop tries to correct for the reference cell noise. Eventually the loop will recover from the noise and return to its steady state, but in the meantime the pump current is in error and in turn causes the A/F ratio to be in error.

So in other words, the wires for the heater are located in the same wire harness as the reference and pump cell wires. Coupling between the heater wires and the reference and common wires can cause a periodic disruption in the reference voltage which disturbs the control loop. (Coupling occurs within the sensor itself as well.)

This results in a large pump current disturbance that takes a significant amount of time to settle out to the actual pump current. This settling time reduces the ability of the system to get accurate engine synchronous pump current measurements.

Figure 2:
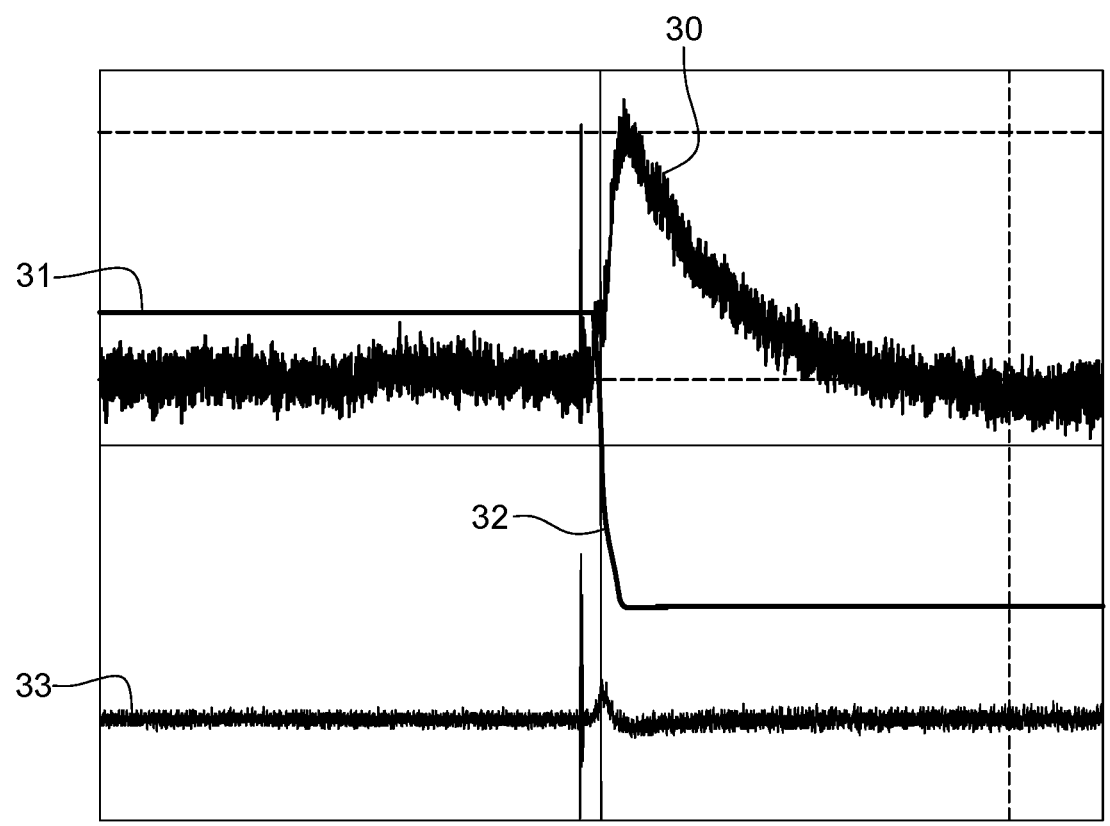
FIG. 2 shows the pump current disruption due to a PWM edge.

FIG. 2 shows a scope plot of the disturbance caused by a PWM edge coupling onto the reference cell which causes a pump cell current disturbance, i.e. the pump current disruption due to a PWM edge. In this example, the pump current disturbance was around 130 µA and lasted around 400 µs. The figure shows the pump current 30, the heater voltage/current 31 with switching edge 32 and the reference cell voltage 33.

Invention

Figure 3:
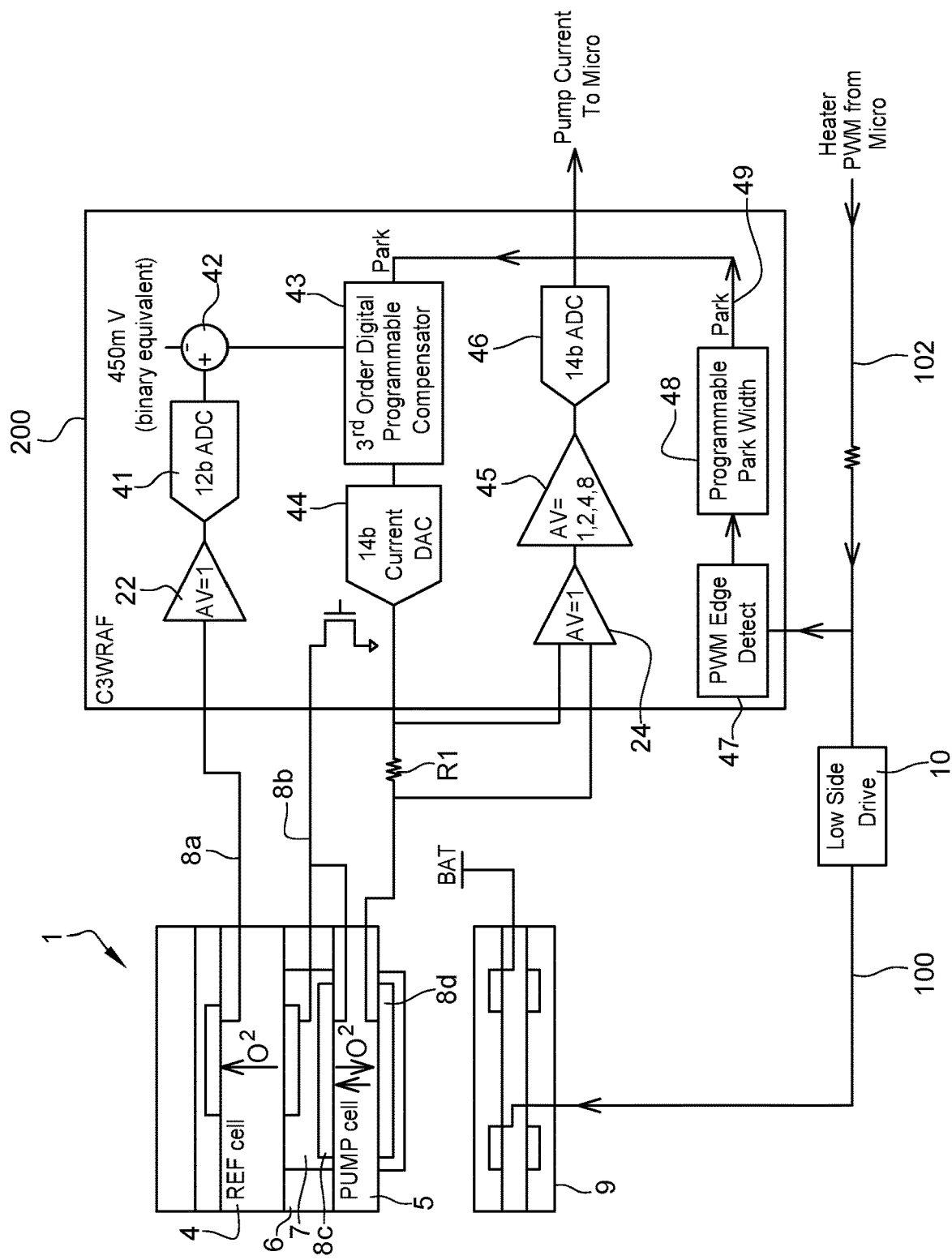
FIG. 3 shows a new O2 sensor control IC with a digital compensator along with a "park" feature.

FIG. 3 shows an example of the invention which shows a design of the compensator circuitry according to one example. Here (in the design for an O2 sensor interface IC 200), the compensator is implemented digitally. This allows for a flexible O2 sensor control IC with a digital compensator. This provides several benefits, one of which is that the compensator transfer function is programmable via a Serial Peripheral Interface (SPI) allowing a given hardware configuration to be compatible with a multitude of sensors.

Additionally, a "park" feature can be provided to overcome the above referenced problems as will be described hereinafter.

Like components to FIG. 1 have the same reference numerals. Here the input from electrode 8a again goes through a unity gain amplifier 22 and is then input to an analog to digital converter (ADC) 41 where the voltage level is converted to a digital quantity. A bit sequence which is the binary equivalent to e.g., 450 mV (the nominal voltage of the reference cell) is subtracted from the output of ADC 41 via the digital subtractor circuit 42. The output of the subtractor circuit is then fed to a digital programmable compensator 43 which may be a 3rd order compensator in one example. The output of the digital programmable compensator 43 is connected to the current DAC 44. The current DAC 44 is connected through R1 to the pump cell electrode 8d and outputs current to the pump cell to maintain the reference cell voltage at 450 mV. The output of the current DAC 44 provides the requisite current to the pump cell via electrode 8d to maintain the primary control i.e. to provide the appropriate sensor voltage/current bias.

Optionally the current to the pump cell 5 i.e. to electrode 8d may be determined in a similar fashion to FIG. 1 again by looking at the voltage across resistor R1, where this voltage across the resistor is again fed to a unity gain amplifier 24, the output of which is further amplified by a programmable gain amplifier 45. Programmable gain amplifier 45 in this example has programmable gains of 1, 2, 4, or 8 and its output is fed to analog to digital converter ADC 46. The digital output of this converter is read by the microprocessor.

In addition, there is an input of a conditioned heater PWM signal (from the microprocessor) to the digital programmable compensator 43. This is via a PWM edge detection circuit/function block 47 where the PWM heater signal is fed from line 102 from the microprocessor output to the heater Low Side Drive 10 and to PWM edge detection block 47.

It should be noted that the Low Side Driver 10 may be incorporated into sensor interface IC 200 or may be a whole, or part of, a separate integrated circuit.

The PWM edge detection block 47 detects edges (i.e. rising or falling edges) of the PWM signal; i.e. the heater switching edge (e.g. low to high or high to low) is detected.

The output of PWM edge detection block 47 is connected to a Programmable Park Width circuit 48 (a programmable Park signal generator) which determines a "park" or suspend time signal which is of programmable and variable time (and which starts on the detection of the edges detected by PWM edge detection block 47) which is fed to the digital programmable compensator 43. The digital programmable compensator 43 puts on hold certain processes during the park time, to avoid disruption from the edges. When the park time expires, the compensator unit resumes normal operation. While the digital compensator is parked, the pump current is held constant at whatever value it was at prior to the park signal becoming active.

The implementation of this park feature is described with reference also to FIG. 4 (which shows the same plots as FIG. 2 with like reference numerals) and shows the implementation with the PWM edge detection block 47 and Programmable Park Width circuit 48 providing an input to the digital programmable compensator 43 via line 49.

When the digital programmable compensator 43 receives the "park" command or "park" signal, it no longer accepts A/D convertor inputs from ADC 41/digital subtractor circuit 42, and freezes the computation of the transfer function. Upon expiration of the park command/signal, the digital programmable compensator 43 resumes normal operation. This effectively masks the noise from entering the digital programmable compensator. 43 Another benefit relates to the problem of disruption of the primary control loop due to PWM edge noise.

In other words, the circuitry of this invention senses the heater PWM edge and "parks" the digital programmable compensator 43 for a programmable amount of time in order to prevent the reference cell disturbance from perturbing the control loop. Parking and resuming the digital programmable compensator 43 involves carefully pausing and restarting the digital programmable compensator 43 with respect to the ADC updates. This greatly reduces the pump current disturbance allowing for improved engine synchronous pump current (A/F ratio) readings.

Figure 4:
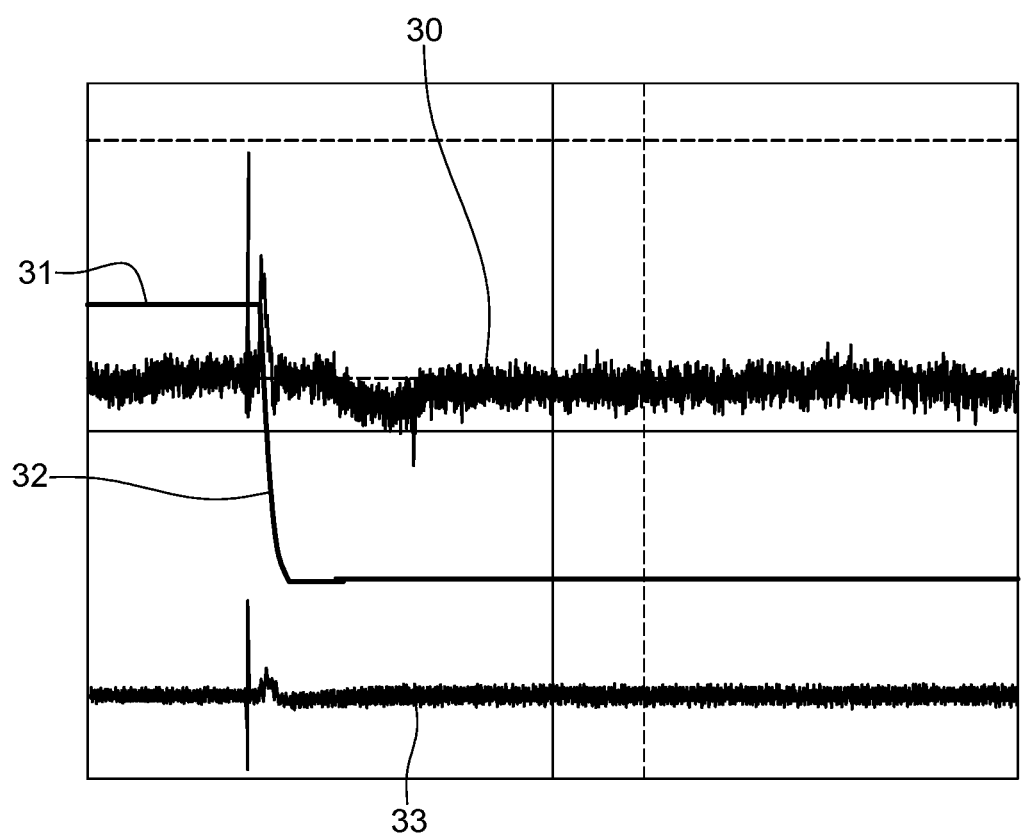
FIG. 4 shows the pump current disruption when the digital compensator is parked upon the PWM edge.

For comparison, FIG. 4 is similar to FIG. 2 and shows the pump current 30, the heater voltage/current 31 with switching edge 32 and reference cell voltage and shows the respective waveforms where the compensator was parked for a fixed period of time at the PWM edge. FIG. 4 shows the pump current disruption when the digital compensator is parked upon the PWM edge. The error in pump current was reduced to 25 µA with a duration of less than 200 µs.

It should be noted that any functionality of the sensor interface IC 200 may be performed by the microprocessor and vice versa.

In addition, any of the functionality of ADC 41 and/or digital subtractor circuit 42 may be incorporated into the digital programmable compensator 43. Likewise, any of the functionality of PWM edge detection block 47 and or Programmable Park Width circuit 48 may be embodied in the digital programmable compensator 43.

In addition, the functionality of the current DAC 44 may be embodied in the digital programmable compensator 43.

The term "park" should be interpreted as "suspend" and thus with reference to parking digital compensator activity this should be alternatively considered as suspending (pausing and restarting) digital compensator activity/functions.

We claim:

1. Compensator circuitry for an oxygen sensor which includes a pump cell and a reference cell, said compensator circuitry including a feedback control loop configured to maintain the reference cell at a reference voltage, said feedback control loop including a digital compensator configured to determine and output a compensation current to said pump cell dependent on a reference voltage measured from said reference cell, and further configured to suspend determination and output of said compensation current for a set time dependent on detection of edges in an oxygen sensor heater Pulse Width Modulation (PWM) signal.

2. Compensator circuitry as claimed in claim 1 wherein said digital compensator is programmable.

3. Compensator circuitry as claimed in claim 1 wherein said set time is programmable.

4. Compensator circuitry as claimed in claim 1 configured to suspend determination and/or output of said compensation current for a set time subsequent to detection of a rising or falling edge of said oxygen sensor heater PWM signal.

5. Compensator circuitry as claimed in claim 4 including means to detect a rising or falling edge of said PWM signal.

6. Compensator circuitry as claimed in claim 1 including means to provide a suspend signal or time of programmable length subsequent to the detection of a rising or falling edge of said PWM signal.

7. Compensator circuitry as claimed in claim 1 further configured to convert the measured reference voltage of the reference cell to a digital quantity, and further configured to digitally compare this with a digital reference value, so as to provide a digital comparison for said digital compensator, where said compensation current is determined from said digital comparison.

8. Compensator circuitry as claimed in claim 1 further including means to determine the compensation current to be output to the pump cell, and convert this to a digital value.

9. Compensator circuitry as claimed in claim 1 configured to suspend the determination and output of said compensation current by being configured to suspend receiving the input derived from said reference cell and/or suspend the determination and/or output of the output current.

10. An oxygen sensor system comprising:
   an oxygen sensor, said oxygen sensor including a pump cell and a reference cell, and including a heater configured to receive a PWM signal to control said heater; and
   compensator circuitry including a feedback control loop configured to maintain the reference cell at a reference voltage, said feedback control loop including a digital compensator configured to determine and output a compensation current to said pump cell dependent on a reference voltage measured from said reference cell, and further configured to suspend determination and output of said compensation current for a set time dependent on detection of edges in the PWM signal.

11. A method of operating compensator circuitry for an oxygen sensor including a pump cell and a reference cell, said compensator circuitry including a feedback control loop adapted to maintain the reference cell at a reference voltage, said feedback control loop including a digital compensator, configured to determine and output a compensation current to said pump cell dependent on a reference voltage measured from said reference cell, said method comprising:
   a) detecting edges in an oxygen sensor heater Pulse Width Modulation (PWM) signal;
   b) suspending determination and output of said compensation current for a set time dependent on step a).

12. A method as claimed in claim 11 wherein said set time is programmable.

13. A method as claimed in claim 11 where step b) comprises suspending the determination and/or output of said compensation current for a set time subsequent to detection of a rising or falling edge of said PWM signal.

14. A method as claimed in claim 11 including providing a suspend signal or suspend signal time of programmable amount subsequent to the detection of a rising or falling edge of said PWM signal.

15. A method as claimed in claim 11 including the steps of converting the measured reference voltage of the reference cell to a digital quantity, and digitally comparing this with a digital reference value, providing a digital comparison to said digital compensator, and determining said compensation current from said digital comparison.

16. A method as claimed in claim 11 where step b) comprises suspending the receiving of input derived from said reference cell and/or suspending the determination and/or output of the output current.

* * * * *